(12) United States Patent
Erkelenz et al.

(10) Patent No.: US 10,113,647 B2
(45) Date of Patent: *Oct. 30, 2018

(54) SEALING STRIP FOR A SEALING DEVICE IN A MACHINE FOR PROCESSING A PAPER, CARDBOARD, OR TISSUE WEB

(71) Applicant: VOITH PATENT GMBH, Heidenheim (DE)

(72) Inventors: Marc Erkelenz, Ulm (DE); Jochen Honold, Schlingen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,655

(22) Filed: Sep. 27, 2017

(65) Prior Publication Data

US 2018/0017162 A1 Jan. 18, 2018

Related U.S. Application Data

(60) Continuation of application No. 15/433,565, filed on Feb. 15, 2017, which is a division of application No. (Continued)

(30) Foreign Application Priority Data

Aug. 15, 2012 (DE) .................... 10 2012 214 530

(51) Int. Cl.
*D21F 3/10* (2006.01)
*F16J 15/16* (2006.01)
(Continued)

(52) U.S. Cl.
CPC .............. *F16J 15/162* (2013.01); *D21F 3/10* (2013.01); *D21F 7/00* (2013.01); *F16C 13/00* (2013.01); *H05K 999/99* (2013.01)

(58) Field of Classification Search
CPC .... D21F 3/10; D21F 7/00; F16J 15/162; F16J 15/16; F16C 13/00
See application file for complete search history.

(56) References Cited

U.S. PATENT DOCUMENTS 2,290,777 A 7/1942 Street
2,578,551 A * 12/1951 Hornbostel ............... D21F 3/10
162/371
(Continued)

FOREIGN PATENT DOCUMENTS

DE 68903534 T3 5/1997
DE 29804050 U1 6/1998
(Continued)

*Primary Examiner* — Eugene G Byrd
(74) *Attorney, Agent, or Firm* — Laurence A. Greenberg; Werner H. Stemer; Ralph E. Locher

(57) ABSTRACT

A sealing device seals a pressure or vacuum zone of a roller having a roller sleeve which is movable in relation to the sealing device. The sealing device has a sealing strip with an upper side forming a sealing face and a lubricant channel adjoining the sealing face and is formed by at least one groove-type depression in the sealing strip, which extends in the longitudinal direction of the sealing strip. When the sealing device is installed, the sealing face and the opening of the groove-type depression face toward the inner side of the roller sleeve. The lubricant channel is hooked up to a supply line which at least in portions runs within the sealing strip and delivers lubricant between the inner side of the roller sleeve and the sealing face. The sealing strip, at each of its two ends, has a wall delimiting the lubricant channel in its length.

8 Claims, 3 Drawing Sheets

Related U.S. Application Data

14/421,210, filed as application No. PCT/EP2013/066672 on Aug. 9, 2013, now Pat. No. 9,650,743.

(51) Int. Cl.
*D21F 7/00* (2006.01)
*F16C 13/00* (2006.01)

(56) References Cited

U.S. PATENT DOCUMENTS

| | | | |
|---|---|---|---|
| 2,969,837 A | 1/1961 | Reynar | |
| 3,185,618 A * | 5/1965 | Wiggins | D21F 3/10 162/369 |
| 4,076,582 A * | 2/1978 | Burkhart | D21F 3/105 162/272 |
| 4,530,227 A * | 7/1985 | Schlatter | B21B 13/14 384/116 |
| 4,556,454 A * | 12/1985 | Dahl | D21F 3/0218 100/118 |
| 4,568,423 A * | 2/1986 | Laapotti | D21F 3/0218 100/156 |
| 4,576,682 A * | 3/1986 | Laapotti | D21F 3/0218 100/154 |
| 4,917,768 A | 4/1990 | Ilmarinen | |
| 5,262,011 A * | 11/1993 | Ilmarinen | D21F 3/0218 162/205 |
| 5,925,219 A * | 7/1999 | Schiel | D21F 3/0218 162/205 |
| 6,030,327 A | 2/2000 | Suomalainen et al. | |
| 6,312,564 B1 * | 11/2001 | Grabscheid | D21F 3/10 162/369 |
| 6,334,934 B1 * | 1/2002 | Heinzmann | D21F 3/10 162/367 |
| 6,395,137 B1 * | 5/2002 | Snellman | D21F 3/10 162/369 |
| 6,592,721 B1 * | 7/2003 | Anderson | D21F 3/10 162/274 |
| 7,635,419 B2 * | 12/2009 | Iijima | D21F 3/0218 100/156 |
| 9,650,743 B2 * | 5/2017 | Erkelenz | D21F 7/00 |
| 2004/0168603 A1 * | 9/2004 | Boga | C09K 3/10 101/494 |
| 2009/0000753 A1 | 1/2009 | Vestola et al. | |
| 2013/0328272 A1 | 12/2013 | Honold | |
| 2015/0218753 A1 * | 8/2015 | Erkelenz | D21F 3/10 492/28 |

FOREIGN PATENT DOCUMENTS

WO 2007003698 A1 1/2007
WO 2012110320 A1 8/2012

* cited by examiner

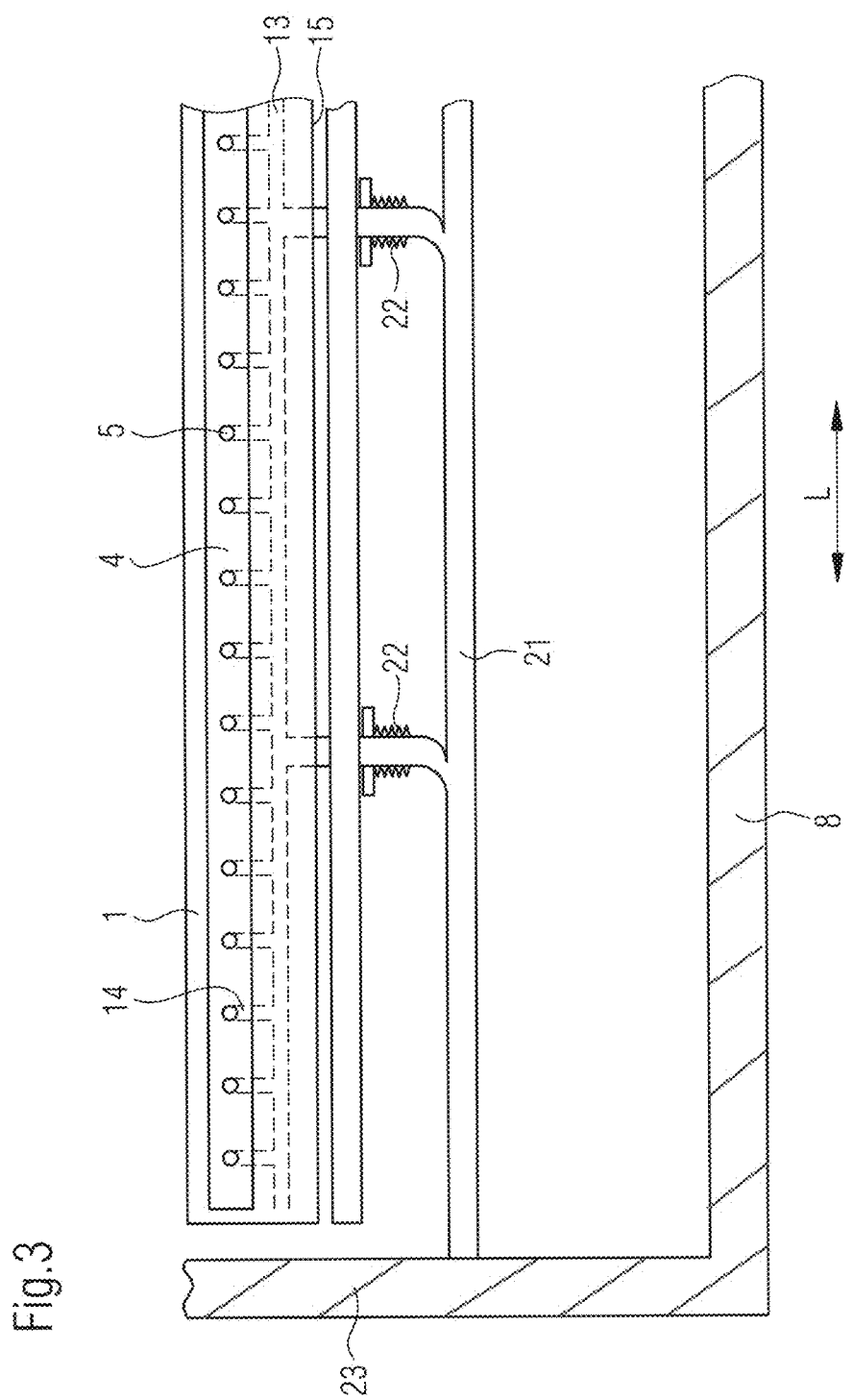

SEALING STRIP FOR A SEALING DEVICE IN A MACHINE FOR PROCESSING A PAPER, CARDBOARD, OR TISSUE WEB

CROSS-REFERENCE TO RELATED APPLICATION

This is a continuation of patent application Ser. No. 15/433,565, filed Feb. 15, 2017, which was a divisional of patent application Ser. No. 14/421,210, filed Feb. 12, 2015, now U.S. Pat. No. 9,650,743 B2, which was a § 371 national stage of international patent application No. PCT/EP2013/066672, filed Aug. 9, 2013; this application also claims the priority, under 35 U.S.C. § 119, of German patent application DE 10 2012 214 530.3, filed Aug. 15, 2012; the prior applications are herewith incorporated by reference in their entirety.

BACKGROUND OF THE INVENTION

Field of the Invention

The invention relates to a sealing device for sealing a pressure or vacuum zone of a roller having a roller sleeve which is movable in relation to the sealing device. The sealing device comprises a sealing strip having an upper side which provides a sealing face and a lubricant channel which adjoins the sealing face and is formed by at least one groove-type depression in the sealing strip. The depression extends in the longitudinal direction of the sealing strip. When the device is properly installed in the roller, the sealing face and the opening of the groove-type depression face toward the inner side of the roller sleeve. The lubricant channel is hooked up to at least one supply line which at least in portions runs within the sealing strip and which delivers lubricant between the inner side of the roller sleeve and the sealing face.

Sealing devices in suctioned or blown rollers for paper-making, cardboard-making, or tissue-making machines have to reliably seal the positive-pressure or negative-pressure zone in relation to the environment where normal pressure prevails. Here, in order to seal the positive-pressure or negative-pressure zone, the sealing face of each sealing strip of the sealing device is placed against the inner side of the rotating roller sleeve. In order to reduce wear of the sealing strip on account of friction between the sleeve face and the sealing face, the introduction of a lubricant between the sealing face and the inner side is attempted. This is usually done using injection pipes which, in the rotation direction of the roller, are disposed ahead of the first sealing strip of the positive-pressure or negative-pressure zone. Here, the lubricant is applied to the inner side of the roller sleeve and conveyed by said roller sleeve by way of its rotation to the individual sealing strips, on account of which, when viewed in the rotation direction, the lubricant supply decreases from sealing strip to sealing strip. In order to nevertheless supply the downstream sealing strips in the rotation direction with sufficient lubricant, a large amount of lubricant has to be used, only a small part thereof benefiting the lubrication of the sealing strips per se however, and otherwise contributing toward the undesirable re-humidification of the fibrous web.

SUMMARY OF THE INVENTION

In order to solve this problem, the applicant proposes an invention whereby the lubricant is directly guided to the upper side of the respective sealing strip which provides the sealing face, so that each individual sealing strip is supplied in a targeted manner with the required amount of lubricant. A preferred design embodiment of this invention further proposes here a lubricant channel in the form of a groove-type depression, which, extending in the longitudinal direction of the sealing strip, i.e. in the machine cross direction of the roller, is provided on the upper side of the roller and which is disposed beside the sealing face. Surprisingly, it has emerged that in comparison with usual amounts, adequate lubrication can be achieved even with modest amounts, of lubricant. Initial experiments of the applicant of the above-mentioned invention were carried out using sealing strips having a lubricant channel which is open on two ends on the longitudinal side of the sealing strip. It has been demonstrated that using this configuration, the lubrication performance indeed may be significantly improved at significantly lower lubricant consumption, but that under certain circumstances a lubricating effect which is irregular across the length of the sealing strip and which can only be leveled out by an increase—indeed below the known level—in the amount of lubricant, is achieved.

It is thus the object of the present invention to propose a sealing device which comprises at least one sealing strip, in which the lubricant consumption can be further reduced while maintaining a homogeneous lubricating effect, when viewed across the length of the sealing strip.

The object is achieved by a sealing device for sealing a positive-pressure or negative-pressure zone of a roller having a roller sleeve which is movable in relation to the sealing device, wherein the sealing device comprises a sealing strip which in its length is delimited by two ends and which has an upper side, and the upper side provides a sealing face and a lubricant channel which adjoins the sealing face, wherein the lubricant channel is formed by at least one groove-type depression in the sealing strip, which extends in the longitudinal direction of the sealing strip, and in the case of the installation of the sealing device in the roller according to the intended use, the sealing face and the opening of the groove-type depression face toward the inner side of the roller sleeve, wherein the lubricant channel is hooked up to at least one supply line which at least in portions runs within the sealing strip and by means of which a lubricant is deliverable between the inner side of the roller sleeve and the sealing face, wherein the sealing strip in its length is delimited by two ends. The invention is characterized in that the sealing strip in the region of its two ends has in each case one wall which closes off the lubricant channel in its length.

On account of the lubricant channel being closed off in its length on both sides, the former is configured so as to be tub-like, on account of which a level of lubricant which is uniform across the length of the lubricant channel can be reached and the lubricant channel forms a type of reservoir for the lubricant. On account thereof, a substantially constant level of lubricant can be maintained, even in the case of variable dispensing of lubricant by the supply line. On account thereof, the amount of required lubricant can be further reduced and the failsafe running functions in the case of a short-term outage of the lubricant supply can be improved. On account thereof, the operating costs caused by lubricant consumption are not only significantly reduced, but re-humidification of the fibrous web, in particular the paper, cardboard, or tissue web, is also significantly reduced, since in absolute terms less lubricant has to be employed for an adequate lubricating effect and, on account of the lubricant channel being closed at both ends, less lubricant runs off unused and can make its way via bores in the roller sleeve to the fibrous web.

Advantageous design embodiments and refinements of the invention are stated in the dependent claims.

Preferably, the lubricant channel extends substantially across the entire length of the sealing strip. Substantially here is to mean that the lubricant channel extends across at least 90% of the length of the sealing strip. Here, the sealing strip may extend in an uninterrupted manner. The two walls delimiting the lubricant channel in its length preferably have a thickness, when viewed in the longitudinal direction of the sealing strip, of 20 cm maximum, preferably 10 cm maximum. In the case of a usual sealing strip, this may mean that the lubricant channel extends across a plurality of meters, whereas the two walls at the ends of the sealing strip in each case extend across 20 cm maximum, in particular 10 cm maximum.

In order to design the construction of the sealing device in a simple manner in respect of the hook-up of the supply line to the sealing strip and to nevertheless ensure uniform deployment of the lubricant across the length of the sealing strip, a preferred design embodiment of the invention provides that the supply line comprises a central supply duct which extends within the sealing strip along the longitudinal direction of the latter, and at least one riser line, preferably a plurality of riser lines, which interconnect(s) the lubricant channel and the central supply duct and via which the lubricant channel is fed with the lubricant by way of outlet openings of the respective riser line, which end in the lubricant channel. According to this design embodiment, the central supply duct can be fed with the lubricant by way of one or a few supply lines. The central supply duct then distributes the lubricant to a plurality of riser lines—wherein the number of riser lines is significantly higher than the number of supply lines. It is conceivable in this context for there to be an outlet opening disposed about every 5 to 500 mm, when viewed in the longitudinal direction of the sealing strip.

In order to be able to furthermore better homogenize the deployment of the amount of lubricant and to hereby provide a solution from the construction and the manufacturing-engineering point of view, a further advantageous design embodiment of the invention provides that the central supply duct, along its longitudinal extent, has a variable cross-sectional area and/or cross-sectional geometry. This design embodiment of the invention may also represent an autonomous inventive solution. Such a central supply duct having a variable cross section may be manufactured in a particularly simple manner in that, for example, initially a groove, for example a U-shaped groove, which is open toward one of the long sides of the main body, is incorporated into the main body of the sealing strip, the opening of which groove is then closed off using sealing-strip material, and then partially closed off for example by means of a profiled body reproducing the width and length of the groove, but not the latter's depth. This profiled body may then be fastened on the main body by way of adhesive bonding, for example, and, together with said main body, configure a duct which provides the central supply duct.

In order to achieve an effective lubricating effect, a preferred design embodiment of the invention provides that the sealing face and the lubricant channel are disposed on the upper side in such a manner that, in the case of the installation of the sealing device in the roller according to the intended use, when viewed in the envisaged rotation direction of the roller sleeve, the lubricant channel is disposed upstream of the substantial part of the sealing face, in particular that the lubricant channel is disposed upstream of the entirety of the sealing face. On account thereof, it is achieved that the inner side of the roller sleeve is wetted with the lubricant directly before said inner face runs onto the sealing face or at least the substantial part of the sealing face.

Where reference is made in the context of this application to the operation of the sealing device in the roller according to the intended use, this is to be understood to be the operating state in which the sealing strip with its sealing face is placed against the inner side of the roller sleeve in such a manner that a sealing effect is achieved.

A further preferred design embodiment of the invention provides that the sealing strip is delimited in its width by a front and a rear end side, and the upper side of the sealing strip extends between the front and the rear end side, wherein the front and rear end sides, and the sealing face, and the lubricant channel, are disposed in such a manner that, in the case of the installation of the sealing device in the roller according to the intended use, and when viewed in the envisaged rotation direction of the roller sleeve, the roller sleeve runs onto the sealing strip in the region of the front end side, initially sweeps the lubricant channel and subsequently the sealing face, so as to run off the sealing strip in the region of the rear side.

When viewed in a sectional plane which is perpendicular to the longitudinal extent of the sealing strip, the lubricant channel displays a bed which forms the lowest point of the lubricant channel and which has a front side wall which extends to the front end side, and a rear side wall which extends to the sealing face. Here, the upper edge of the front side wall in particular adjoins the front end side, and the upper edge of the rear side wall in particular adjoins the sealing face. It is preferably provided that in the case of the installation of the sealing device in a roller according to the intended use, a straight line interconnecting the two upper edges forms an angle of 1° to 89° with the horizontal, in particular an angle of 15° or more and 80° or less.

On account thereof, the straight line interconnecting the two upper edges forms a type of wedge-shaped gap between the upper side of the sealing strip and the inner side of the roller sleeve, which is largest at the front end side and tapers off toward the sealing face. On account thereof, a suction effect is achieved by the air entrained by the rotating roller sleeve, which draws the lubricant along into the gap between the inner side of the roller sleeve and the sealing face.

According to a specific design embodiment of the invention, in the case of the installation of the sealing device in the roller and the operation thereof according to the intended use, when viewed in the radial direction of the roller, the rear end side then extends so as to be closer to the inner side of the roller sleeve than the front end side; in particular, the rear end side extends up to the inner side of the roller sleeve, whereas the front end side does not extend up to the inner side of the roller sleeve.

According to a potential design embodiment of the invention, the front and the rear sides of the sealing strip extend so as to be substantially parallel with one another.

A further preferred design embodiment of the invention provides that the sealing device comprises a sealing-strip holder for holding the sealing strip, wherein the sealing-strip holder has a holding portion having at least one guide face on which the sealing strip by way of at least one of the two sides of front and rear side is displaceably mounted, on account of which the sealing strip, in the case of the installation of the sealing device in the roller according to the intended use, when viewed along a path in the radial direction of the roller, is displaceable from and to the inner side of the roller sleeve face, wherein the supply line at at least one point on one of the two end sides is routed out of the sealing strip, and wherein the holding portion has at least one clearance through which that portion of the supply line that is routed out of the end side of the sealing strip is routed through the sealing-strip holder, and wherein the at least one clearance is configured in such a manner that the sealing strip is movable along the path in relation to the sealing-strip holder together with the portion of the supply line which is routed out thereof.

It is conceivable for the at least one clearance to be configured so as to be hole-shaped or as a groove which is open toward the top.

According to another independent aspect of the invention, a roller comprising at least one positive-pressure or negative-pressure zone having at least one sealing device as claimed is described.

It is preferably provided that the part of the supply line which runs outside the sealing strip but within the roller has a flexurally rigid first line portion and a second line portion which in relation to the former is flexural, or is configured therefrom, respectively. Here, the flexural second line portion is significantly shorter than the flexurally more rigid first line portion.

On account of the flexural, short second line portion, free displaceability of the sealing strip in relation to the sealing-strip holder is ensured in the radial direction of the roller, toward the inner side of the roller sleeve or away therefrom. The first line portion of the part of the supply line which runs within the roller but outside the sealing strip may be configured so as to be flexurally rigid and thus stable. When conceiving and disposing the flexural second line portion, attention has to be paid, in particular, to said flexural second line portion running such that it does not chafe on components within the roller when the sealing strip moves. Steel pipes, for example, may be used for the first line portion. For the second line portion a rubber tube may be used, for example, which may be reinforced with steel braiding, for example.

It is particularly conceivable that the flexurally rigid first line portion commences at the at least one roller end and extends in the roller in the direction of the sealing strip. It is further conceivable that the flexural second line portion commences so as to be spaced at one meter maximum from the at least one point at which the supply line is routed out from the sealing strip. In order to be able to at least allow for the travel of the sealing strip due to wear, it is in particular conceivable that the flexural second line portion has a length in the range of 15 cm to 200 cm, in particular has a length in the range of 20 cm to 200 cm.

It is further conceivable for each of the two roller ends to comprise a roller cap, and for the supply line to be routed out of the roller at at least one of the roller caps.

The flexural second line portion preferably commences at that point at which the supply line is routed out of the sealing strip.

The supply line preferably displays a fourth line portion, to which the central supply duct and the at least one riser line may belong, for example, which is integral to or is unreleasably connected to the sealing strip, and a third line portion which is releasably connected to the fourth line portion and which runs outside the sealing strip and preferably is routed to at least one of the two roller ends. On account thereof, it is enabled that the sealing strip, for example when being replaced or during maintenance, can be readily hooked up to the lubricant supply and separated therefrom again.

Preferably, in the region of the at least one point at which the connecting line is routed out of the sealing strip, at least one connecting element, for example in the form of a bush which is sealed by an O-ring, by means of which the third and the fourth line portions are releasably interconnected, is provided in this case, that is to say that according to this embodiment, the fourth line portion extends substantially within the sealing strip and terminates at the connecting element. The third line portion then is routed outside the sealing strip and is releasably connected to the fourth line portion by way of the at least one connecting element. It is quite possible for the fourth line portion to run within the sealing strip in such a branched manner that said fourth line portion is routed out of the sealing strip at a plurality of points which are disposed beside one another in the longitudinal direction of the sealing strip, for example. In this case, preferably one connecting element by means of which the respective branch is connected to the third line portion is then disposed in the region of each point at which a branch of the fourth line portion is routed out of the sealing strip.

The third line portion preferably is made up of the first and the second line portions.

The lubricant preferably is substantially water. The term "substantially" here refers to the potential possibility of adding lubricant additives to the water, wherein water always represents the major component of such a mixture (in relation to percent per volume).

According to a further independent aspect of the invention, a method for manufacturing and/or processing a paper, cardboard, or tissue web using a paper-making, cardboard-making, or tissue-making machine, in which the paper, cardboard, or tissue web is manufactured or processed at a production speed of 500 meters per minute or more, and the web, together with a paper-making machine covering, is at least in portions guided over at least one roller having a perforated roller sleeve and at least one positive-pressure or negative-pressure zone, wherein the positive-pressure or negative-pressure zone is sealed by at least one sealing device having at least one sealing strip and at least one of the at least one sealing strip has an upper side which faces toward the inner side of the roller sleeve and which provides a sealing face which is placed against the inner side of the roller sleeve, and at least one lubricant outlet opening, wherein by means of the lubricant outlet opening a lubricant is introduced between the sealing face and the inner side of the roller sleeve, is proposed. The method according to the invention is characterized in that the amount of lubricant used per meter of machine width and per minute is four liters or less, in particular three liters or less, in particular one liter or less.

The inventors have established that sealing strips in which the lubricant is disposed on the upper side which faces toward the inner side of the roller sleeve not only achieve an improved lubricating effect with less wear of the sealing face of the sealing strip, but that in the case of production speeds (also referred to as machine speeds) of 500 meters per minute or more, the consumption of lubricant, in particular substantially water, of often 10 to 15 liters per meter of machine width and minute can be reduced to less than one liter or less per meter of machine width and minute. On account thereof, not only the operating costs caused by lubricant consumption are significantly reduced, but re-humidification of the paper, cardboard, or tissue web is also significantly reduced. The inventors have recognized that by combining machine speeds of 500 meters per minute or more and the use of at least one of the sealing strips having lubrication in the region of the sealing-strip upper side, the lubricating effect, on account of the suction effect at high production speeds, can be further increased in such a manner that an amount of lubricant of one liter per meter of machine width and per minute is sufficient for adequate lubrication.

The lubricant preferably is substantially water. The term "substantially" refers here to the potential possibility of adding lubricant additives to the water, wherein water always represents the major component of such a mixture (in relation to percent per volume).

Experiments of the applicant moreover have unexpectedly demonstrated that energy consumption can also be reduced by more than 5%, caused by the significantly more efficient lubrication of the frictional pairing of the sealing face of the sealing strip and the inner side of the roller sleeve.

Preferably, the production speed is 700 meters per minute or more.

In order to further improve the lubricating effect, a refinement of the method according to the invention proposes the use of at least one sealing device as described, in the method.

Preferably, all sealing strips of the sealing device are equipped with an upper side which faces toward the inner side of the roller sleeve and which provides a sealing face and a lubricant outlet opening for the lubricant by way of which lubricant is introduced in each case separately and independently between the respective sealing face and the inner side of the roller sleeve.

BRIEF DESCRIPTION OF THE SEVERAL VIEWS OF THE DRAWING

The invention is explained in more detail in the following by means of schematic drawings which are not to scale.

FIG. 3 shows a detail of the roller of FIG. 2, in the region of one of its longitudinal ends, in a plan view.

DETAILED DESCRIPTION OF THE INVENTION

Figure 1:
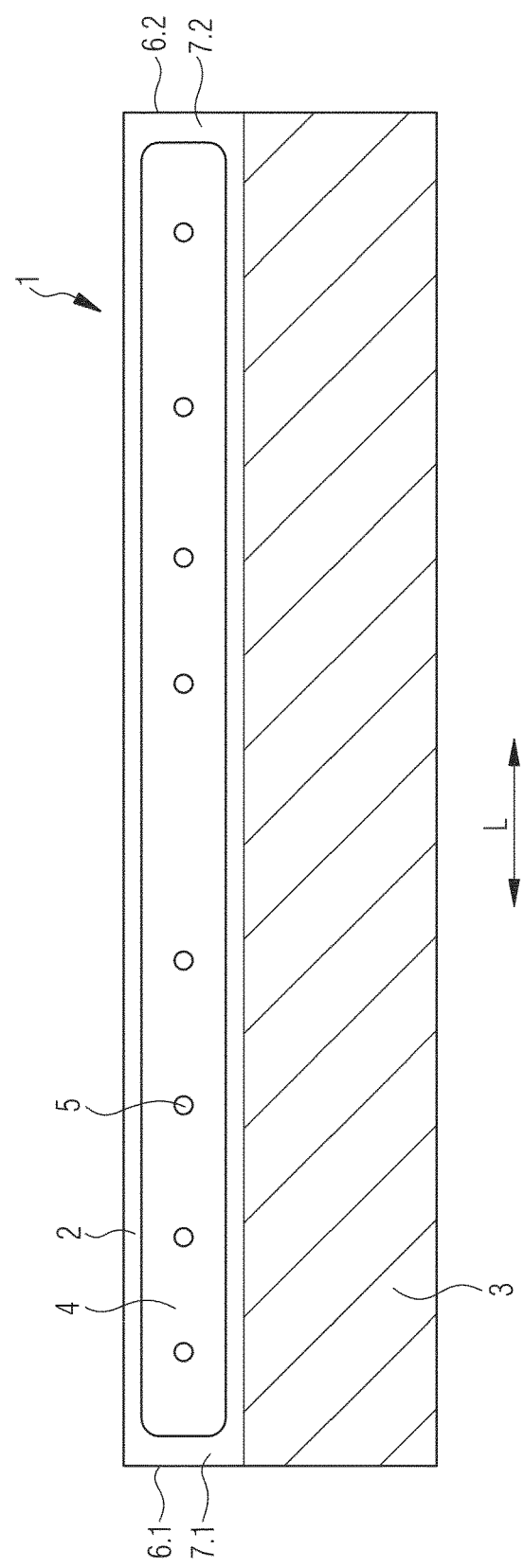
FIG. 1 shows a sealing strip of a sealing device according to the invention, in a plan view.

FIG. 1 shows a sealing strip 1 of a sealing device according to the invention, in a plan view onto the upper side 2 of the sealing strip 1, which in the case of the installation of the sealing device in a roller according to the intended use faces toward the inner side of a rotatable roller sleeve.

The upper side 2 of the sealing strip 1 provides a sealing face 3 (drawn using hatched lines) and a lubricant channel 4 which adjoins the sealing face 3, wherein the lubricant channel is formed by at least one groove-type depression in the sealing strip, which extends in the longitudinal direction L of the sealing strip 1, and in the case of the installation of the sealing device in the roller according to the intended use, the sealing face 3 and the opening of the lubricant channel 4 face toward the inner side of the roller sleeve. It is to be noted at this point that in the case of the installation of the sealing device 9 in the roller 8 according to the intended use, the longitudinal direction L of the sealing strip 1 and the longitudinal direction of the roller coincide and are in each case separately and also commonly referred to with the reference sign L. The length of the sealing strip 1 is to be understood as its maximum extent in the longitudinal direction L.

As can be derived from the illustration of FIG. 1, a multiplicity of lubricant outlet openings 5 of a supply line 12 for supplying lubricant, which are disposed behind one another in the longitudinal direction of the lubricant channel 4 terminate in the lubricant channel 4. The sealing strip 1 in its length is delimited by two ends 6.1 and 6.2. The sealing strip 1 according to the invention, in the region of its two ends 6.1 and 6.2, displays in each case one wall 7.1 and 7.2, delimiting the lubricant channel 4 in its length. The sealing strip 1 has a length of a multiplicity of meters, and each of the two walls 7.1 and 7.2, when viewed in the longitudinal direction L of the sealing strip 1, has a thickness of 20 cm or less, in particular 10 cm or less.

Figure 2:
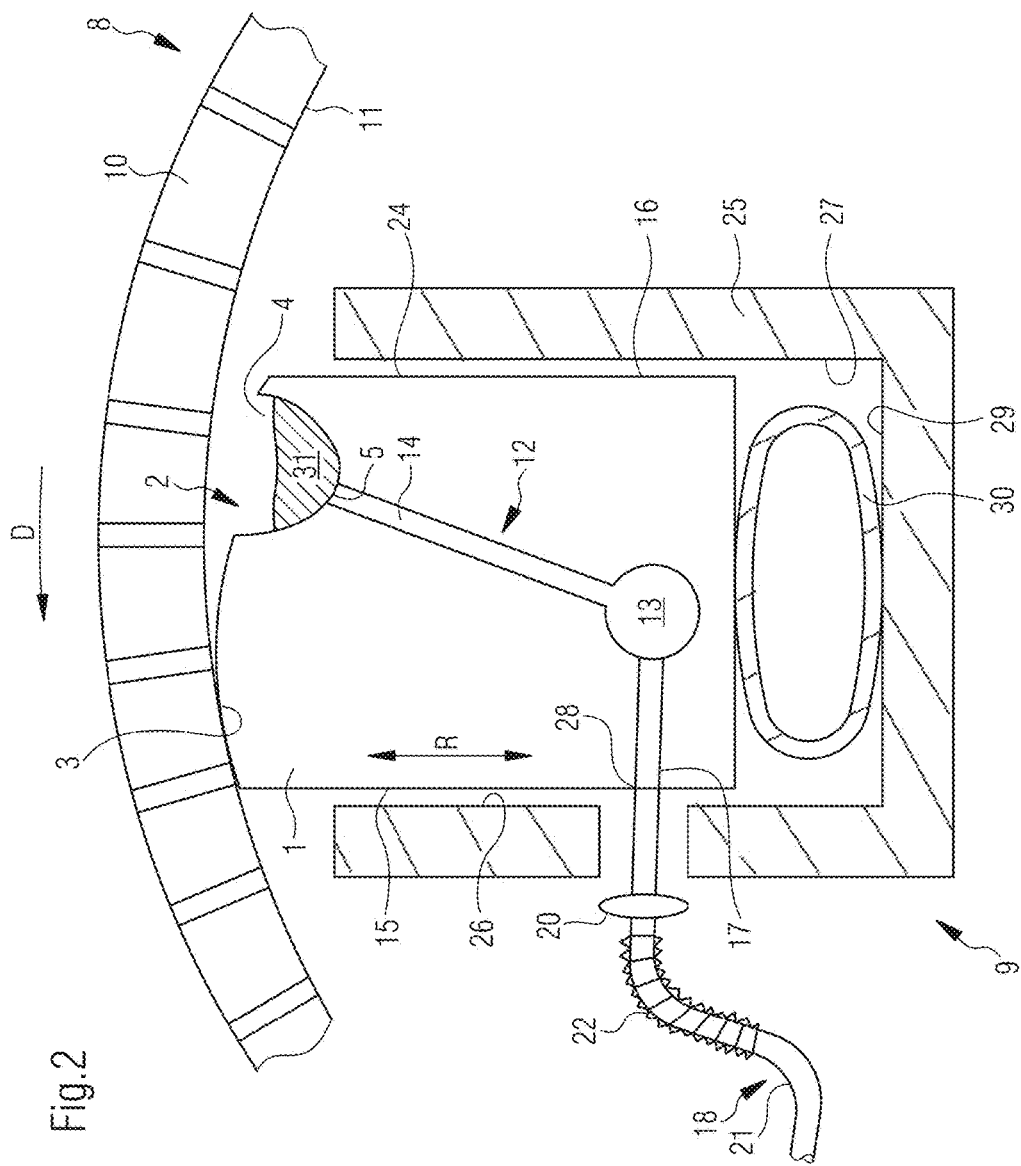
FIG. 2 shows a roller according to the invention, in a sectional plane which is perpendicular to the longitudinal extent of the roller, having the sealing strip from FIG. 1.

FIG. 2 shows a roller 8 according to the invention, in a sectional plane which is perpendicular to the longitudinal extent L of the roller 1. A sealing device 9 according to the invention, having the sealing strip 1 shown in FIG. 1, is installed in the roller 8 according to the intended use. FIG. 2 shows the sealing device 9 having the sealing strip 1 in the position in which the sealing face 3 thereof is placed against the inner side 11 of the roller sleeve 10, in order to seal a positive-pressure zone or negative-pressure zone (not shown). FIG. 3 shows a roller end on the longitudinal side in a plan view, without an illustration of the roller sleeve, wherein components which run within the roller 8 are drawn using dashed lines.

The lubricant channel 4 is hooked up to a supply line 12 which in portions runs within the sealing strip 1 and which, on the side of the sealing strip, terminates at the lubricant outlet openings 5 and by means of which lubricant 31, which is located in the lubricant channel 4, is deliverable between the inner side 11 of the roller sleeve 10 and the sealing face 3.

As can be derived from the illustration of FIG. 2, the sealing face 3 and the lubricant channel 4 are disposed on the upper side 2 in such a manner that in the case of the installation of the sealing device 9 in the roller 8 according to the intended use and during rotation of the roller sleeve 10 in the envisaged rotation direction D, the lubricant channel is upstream of the substantial part of the sealing face 3, in the present case even upstream of the entirety of the sealing face 3.

The sealing strip 1, in its width B, is delimited by a front end side 24 and a rear end side 15 which runs substantially parallel therewith, between which the upper side 2 of the sealing strip 1 extends. Here, the front and rear end sides 24, 15, and the sealing face 3, and the lubricant channel 4, are disposed in such a manner that in the case of the installation, shown in FIG. 2, of the sealing device 9 in the roller 8 according to the intended use and during rotation of the roller sleeve when viewed in the envisaged rotation direction D, the roller sleeve 10 runs onto the sealing strip 1 in the region of the front end side 24, initially sweeps the lubricant channel 4 and subsequently the sealing face 3, so as to run off the sealing strip 1 in the region of the rear end side 15.

One can furthermore see that, when viewed in the radial direction R of the roller 8, the rear end side 15 extends so as to be closer to the inner side 11 of the roller sleeve 10 than the front end side 24, on account of which an inlet gap is formed between the upper side 2 of the sealing strip 1 and the inner side 11 of the roller sleeve 10 in the region of the front end side 24.

The sealing device 9 furthermore comprises a sealing-strip holder 25 for holding the sealing strip 1. The sealing-strip holder 25 here presently has a holding portion having two guide faces 26, 27 on which the sealing strip by way of its two sides 15, 24 is displaceably mounted, so as to be displaceable from the front or rear end side in the radial direction R of the roller 8 along a path from and to the inner side 11 of the roller sleeve face 10. The sealing-strip holder 25 furthermore has a base 29 on which a bellows 30, which is filled with a pressure medium such as, for example, air, is supported and by means of which the sealing strip 1 is movable in relation to the sealing-strip holder 25 in the direction R.

It furthermore can be identified that the supply line 12 is routed out of the sealing strip 1 at at least one point 28 at the rear end side 15. In order to ensure free displaceability of the sealing strip 1 in relation to the sealing-strip holder 25, when viewed in the radial direction R of the roller 8, the holding portion has at least one clearance 32 which is configured so as to be hole-shaped and through which the portion of the supply line 12 which is in each case routed out of the rear end side 15 of the sealing strip 1 is routed through the sealing-strip holder 25.

As can be identified from the illustration of FIG. 2, the supply line 12 comprises a portion which is routed within the sealing strip, and a portion which is routed outside the sealing strip 1. The portion of the supply line 12, which is routed within the sealing strip 1 comprises a central supply duct 13 which extends in the longitudinal direction L of the sealing strip 1 and from which a plurality of riser lines 14 which are disposed behind one another in the longitudinal direction L of the sealing strip 1 and which in each case terminate at a lubricant outlet opening 5 in the lubricant channel 4 emanate. One or a plurality of presently horizontally routed line portions which on the rear end side 15 is/are routed out of the sealing strip 1 branch off from the central supply duct 13. It is conceivable that the central supply duct 13 along its longitudinal extent L has a variable cross-sectional area and/or cross-sectional geometry.

The portion of the supply line 12 which runs outside of the sealing strip 1 but within the roller 8 comprises a first line portion 21 and a second line portion 22, as shown in FIGS. 2 and 3. Here, the first line portion 21 is longer than the second line portion 22, and the second line portion 22 is configured so as to be flexural in comparison with the first line portion 21. Presently, the second line portion 22 is formed by a braided metal hose 22. Furthermore, the second line portion 22 commences in a region of at maximum one meter, calculated from the point 28 at which the supply line 12 is routed out from the sealing strip 1, and preferably has a length of 20 to 100 cm, preferably up to 80 cm. The first line portion 21 terminates at one of its longitudinal ends at a longitudinal roller end 23, which is configured as a roller cap, for example, and at its other longitudinal end at a connecting piece 20.

The first and the second line portions 21, 22 together form a third line portion 18. That part of the supply line 12 that runs within the sealing strip 1, and a short line piece which runs between the central supply duct 13 and the point 28 form a fourth line portion 17. The fourth line portion 17 is unreleasably connected to the sealing strip 1 and forms an integral part of the latter. Since it is a fixed component of the sealing strip 1, here the fourth line portion 17 is removed and installed along with the sealing strip 1 when the latter is removed or installed; the third and the fourth line portions 18, 17, are releasably interconnected by way of the connecting element 20.

The invention claimed is:

1. A sealing strip for a sealing device for sealing a pressure or vacuum zone of a suction roll, the sealing strip comprising:
   an upper side with a sealing face and a lubricant channel adjoining said sealing face, said lubricant channel being at least one groove-type depression formed in said sealing strip and extending in a longitudinal direction of said sealing strip;
   wherein, on installation of said sealing strip in the roll, said sealing face and an opening of said groove-type depression face toward an inner side of a roller sleeve;
   at least one supply line hooked up to said lubricant channel, said at least one supply line, at least in portions thereof, running within said sealing strip and delivering lubricant to between the inner side of the roller sleeve and said sealing face; and
   said sealing strip having a length delimited by two ends and a respective wall integrally formed at each of said two ends delimiting a length of said lubricant channel.

2. The sealing strip according to claim 1, wherein said supply line comprises a central supply duct which extends within the sealing strip along the longitudinal direction of said sealing strip, and a plurality of riser lines, which interconnect said lubricant channel and said central supply duct and via which said lubricant channel is fed with the lubricant by way of outlet openings of the respective said riser line, which end in said lubricant channel.

3. The sealing strip according to claim 2, wherein an outlet opening is formed about every 5 to 500 mm, when viewed in the longitudinal direction of the sealing strip.

4. The sealing strip according to claim 1, wherein said supply line is routed out of said sealing strip at at least one point on one of the front end and/or the rear end side of said sealing strip.

5. The sealing strip according to claim 2, wherein said sealing strip further comprises two or more supply line segments routed out of said sealing strip to feed said central supply duct with lubricant.

6. The sealing strip according to claim 1, wherein said lubricant channel is disposed upstream of a substantial part of said sealing face.

7. The sealing strip according to claim 6, wherein said lubricant channel is disposed upstream of an entirety of said sealing face.

8. The sealing strip according to claim 1, wherein said sealing strip comprises only a single said lubricant channel.

* * * * *